No. 664,210. Patented Dec. 18, 1900.
F. KAEFERLE.
COMMUTATOR.
(Application filed Sept. 15, 1900.)

(No Model.)

Witnesses
Robt. Aiton.
Maude E. Aiton.

Inventor.
Fritz Kaeferle
by Thos. A. Aiton
Atty.

UNITED STATES PATENT OFFICE.

FRITZ KAEFERLE, OF HANOVER, GERMANY.

COMMUTATOR.

SPECIFICATION forming part of Letters Patent No. 664,219, dated December 18, 1900.

Application filed September 15, 1900. Serial No. 30,149. (No model.)

*To all whom it may concern:*

Be it known that I, FRITZ KAEFERLE, a subject of the Emperor of Germany, and a resident of Hanover, in the Empire of Germany, have invented a new and useful Improvement in Commutators for Electric Machines, Dynamos, &c., of which the following is a specification.

My invention relates to a new and improved collector for electric machines, dynamos, &c., and embraces certain novel advantages hereinafter set forth and described.

Figure 1:
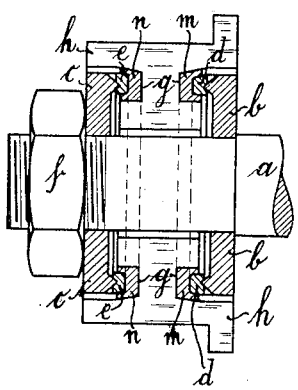
Figure 2:
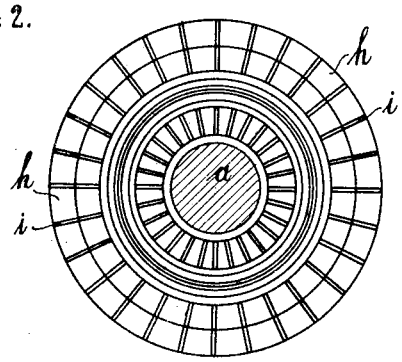
Figure 3:
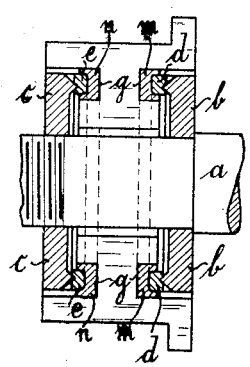

In the accompanying drawings, in which similar letters of reference refer to similar parts, Figure 1 is a sectional elevation of a device embracing my invention. Fig. 2 is an end view thereof. Fig. 3 is a sectional view of a slight modification.

In the construction of my invention I employ an axle $a$, on which disks $b$ and $c$ are mounted. The former is tightly secured to the said axle and the latter (disk $c$) while snugly fitting on the same can be moved backward and forward thereon. The collector-body, formed of a plurality of lamellæ $h$, with intervening insulated material $i$, is provided on each side with annular rabbets or grooves $g$, in which rings $m$ and $n$, consisting of some good insulating material, snugly enter. This body portion surrounds the axle $a$ aforesaid in the known manner, but does not rest upon the said axle, an annular chamber being formed around the same, thus allowing for the contraction and expansion of the body under influence of changing temperatures without disturbing the form or effectiveness of the collector. The disks aforesaid are provided on their faces with projections which enter a V-shaped annular groove or slot formed in rings $d$ and $e$, each of which latter, as shown in the drawings, is angular in cross-section and snugly fits within the said rings $m$ and $n$. The axle $a$ is screw-threaded on its outer end and carries a nut $f$, as shown.

In assembling the collector the disk $b$ is securely fastened on the axle $a$, the rings $d$ and $m$ placed in proper position, and the body slipped on. Disk $c$ is next placed in position after rings $n$ and $e$, when by tightening nut $f$ rings $m$ and $n$ are driven home in grooves $g$, rings $d$ and $e$ into rings $m$ and $n$, and projections formed on said disks forced into their grooves and the entire collector rigidly and firmly bound together and in place on the axle with but the single adjustment. The said rings $m$ and $n$ may be formed as shown in cross-section in Fig. 1, in which their outer edges are somewhat beveled, or may be formed as shown in Fig. 3, with the said edges perfectly angular. It will be thus seen that the body is so held that it cannot become loosened, contraction and expansion of the collector-body under varying temperatures being anticipated and their ill effects eliminated by the annular chamber formed about the axle, the form at all times maintained, the parts gripping one the other in their respective position, and all securely held together and also on the supporting-axle by the one means, as described.

Having now described my invention, what I claim as new, and desire to protect by Letters Patent of the United States of America, is—

1. In a commutator for electric machines the combination of an axle, disks mounted thereon and provided with projections on their inner faces, a body portion provided with annular grooves, rings adapted to enter said grooves, other rings adapted to lie between said first rings and said disk projections, and single means for tightening the said parts and retaining them in their proper position upon said axle, substantially as described.

2. In a commutator for electric machines the combination of a body portion provided with annular grooves, rings adapted to enter the same a second set of rings engaging respectively each of said first rings and provided with V-shaped annular slots, disks provided with projections and means for tightening said parts together and rigidly retaining them in position upon an engaging axle, substantially as described.

3. A new and improved commutator for electric machines, dynamos, &c., having a body portion provided with annular grooves, a ring angularly U-shaped in cross-section adapted to enter said grooves, a second ring snugly fitting in said first ring and provided on its opposite face with an annular V-shaped slot, a disk provided with a projection adapted to enter said slot and single means for tightening and rigidly holding the said parts together and upon a supporting-axle, said parts being combined substantially as described.

In witness whereof I have hereunto set my hand in presence of two witnesses.

FRITZ KAEFERLE.

Witnesses:
  LEONORE KASCH,
  KIRKE LATHROP.